(No Model.)
J. J. SIMON.
POTATO CUTTER AND PLANTER.
No. 492,243. Patented Feb. 21, 1893.
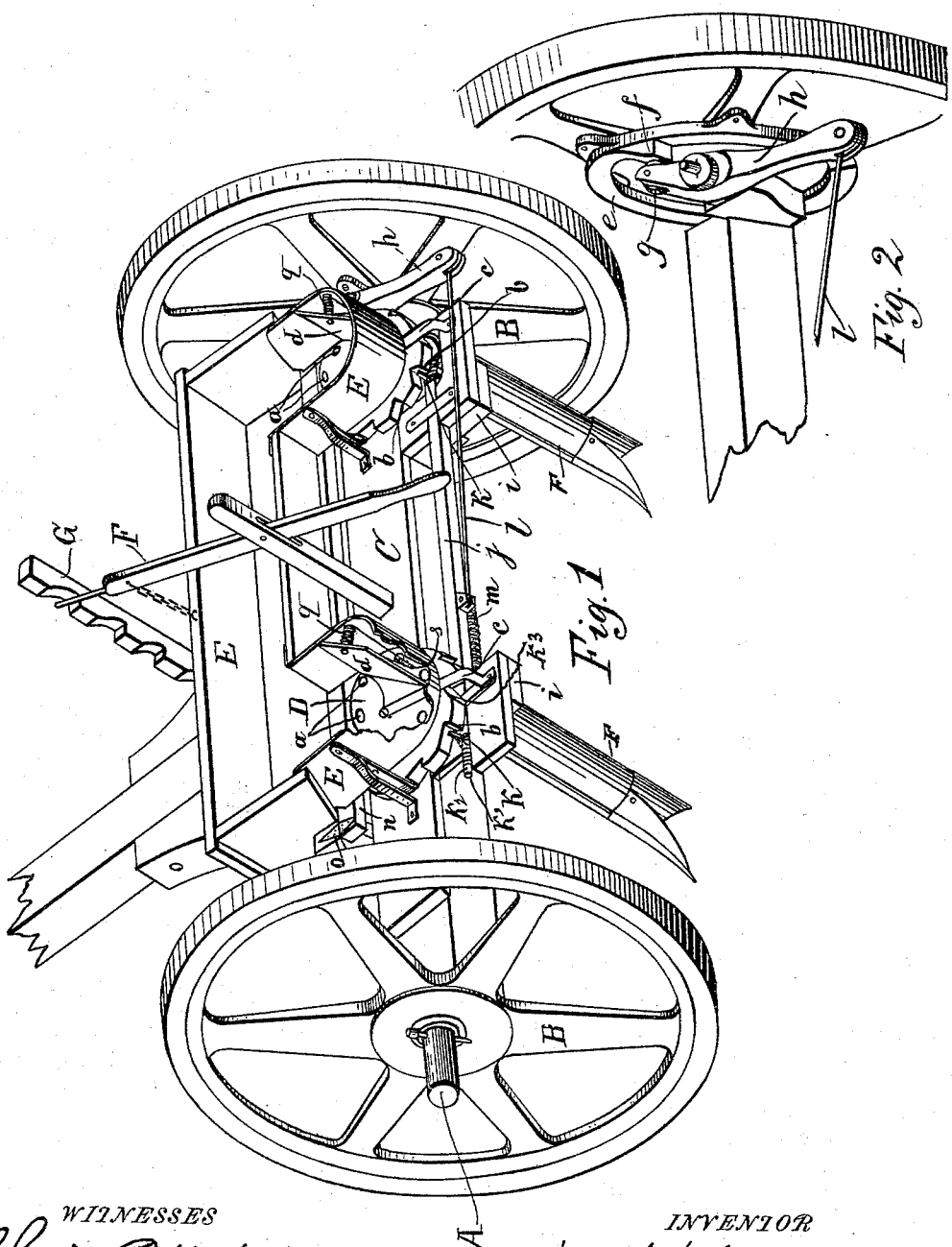
WITNESSES
INVENTOR
Jacob J. Simon
By W. K. Miller
Attorney

UNITED STATES PATENT OFFICE.

JACOB J. SIMON, OF McDONALDSVILLE, OHIO.

POTATO CUTTER AND PLANTER.

SPECIFICATION forming part of Letters Patent No. 492,243, dated February 21, 1893.

Application filed November 7, 1892. Serial No. 451,276. (No model.)

*To all whom it may concern:*

Be it known that I, JACOB J. SIMON, a citizen of the United States, and a resident of McDonaldsville, county of Stark, State of Ohio, have invented a new and useful Improvement in Potato Cutters and Planters, of which the following is a full, clear, and exact description, reference being had to the accompanying drawings, making part of this specification.

My invention relates to an improvement in potato cutters and planters, and consists of certain features of construction and combination of parts as will be hereinafter described and pointed out in the claims.

Figure 1, of the accompanying drawings is a view in perspective of a potato cutter and planter illustrating my invention. Fig. 2, is a similar view of a detached portion.

Referring to Fig. 1, A represents the axle, and B the supporting and actuating wheels. On the axle is placed a base or bottom board C, to which is pivotally secured a rotatable disk D, having a series of perforations $a$ and a series of peripheral notches $b$, to correspond with the perforations. Over the disk D is placed a knife or cutter $c$ as shown in the drawings, above which are placed the circular ended rear projections of the hopper E in which is provided a partition $d$. To rotate the perforated disks, there is placed on the carrying wheel B, a cam wheel $e$ see Fig. 2, on which are provided cams $f$ that engage a roller $g$ in the front end of the vibrator $h$, that moves the forward end in toward the body of the machine. Arms $i$ project rearwardly from this axle, in which is supported a bar $j$, on which are loosely mounted pawls $k$, that are rocked about a spindle portion $k'$ of the bar by the coil spring $k^2$. The bar is connected to the rear end of the lever $h$ by a link $l$ as shown, by which it is moved in one direction to rotate to disks D, the pawls $k$, engaging the notches $b$ and to reverse the movement of the bar $j$, a spring as $m$ is provided as shown in Fig. 1, the energy of which will move the bar against the movement of the cam. The springs $k^2$ will yield to allow the pawl to move back over the grade $k^3$ or the back of the tooth $b$. The front part of the hopper E is secured to a support $n$ by the hinge O and held in adjustment by the hand lever F and rack G, the chain $p$ connecting the front of the hopper to the lever, the front end of the lever resting in one of the notches of the rack G.

The board C has provided therein an aperture to correspond with the apertures $a$ in the disks D.

At the top of the circular portion of the hopper E, extending from the wall of the hopper to the partition $d$, is provided a cross pin $q$ on which is supported a coil spring $r$, one end of which is secured to the pin, the free end to extend down into the space between the partition and the wall of the hopper, and having at its end portion a roller $s$, that will be held by the spring down on the disk D, and drop into the perforations as they pass under the roller, to press the cut portions of the potato down through the aperture $a$ into a corresponding aperture in the bottom board C, from which it will drop into the tube H, and thence into the ground.

In operation the potatoes to be planted are placed in the hopper E which is set at such incline as to allow the potatoes to flow back into the rear portions over the disks D, and to drop into the apertures $a$ which are of such depth as to admit of only a portion of the potato, which will be carried by the disk against the knife $c$, which will cut off that portion in the apertures, and carry it into the apartment formed by the partition $d$ where the roller $s$ will press it out of the apertures $a$ when it will fall down into the tube F, and thence to the ground, the disks being rotated by the cams as hereinbefore stated.

Having thus fully described the nature and object of my invention, what I claim as new, and desire to secure by Letters Patent, is—

1. The combination with the carrying wheels B and the axle A of the support $n$, the hopper E, hinged thereto, the lever F, rack G, perforated disks D, having peripheral notches $b$, cutters $c$, and means for rotating said disks substantially as described and for the purpose set forth.

2. The combination in a potato cutter and planter of the carrying wheels B, and axle A, of the described adjustable hopper, having circular ended rearward projections, and a partition $d$, of the rotatable disk D, having apertures $a$ and peripheral notches $b$, of the cutter $c$, spring $r$, and roller $s$, and means for actuating said disks, substantially as described and for the purpose set forth.

3. The combination with the supporting axle of the hinged adjustable hopper E, having rearward projections, the end portions of which are circular in form and divided by the partition $d$ of the spring $r$, having a pending portion on which is supported a roller $s$, the apertured disks having peripheral notches $b$, the cutter $c$, secured over said disks, the bar $j$, having pawls $k$ to engage the notches $b$, spring $k^3$ to rotate the pawl about the spindle $k'$, a link $l$ connecting the bar to the actuating lever $h$ and the cam wheel $c$, substantially as described and for the purpose set forth.

In testimony whereof I have hereunto set my hand this 22d day of October, A. D. 1892.

JACOB J. SIMON.

Witnesses:
W. K. MILLER,
CHAS. R. MILLER.